Patented Apr. 22, 1941

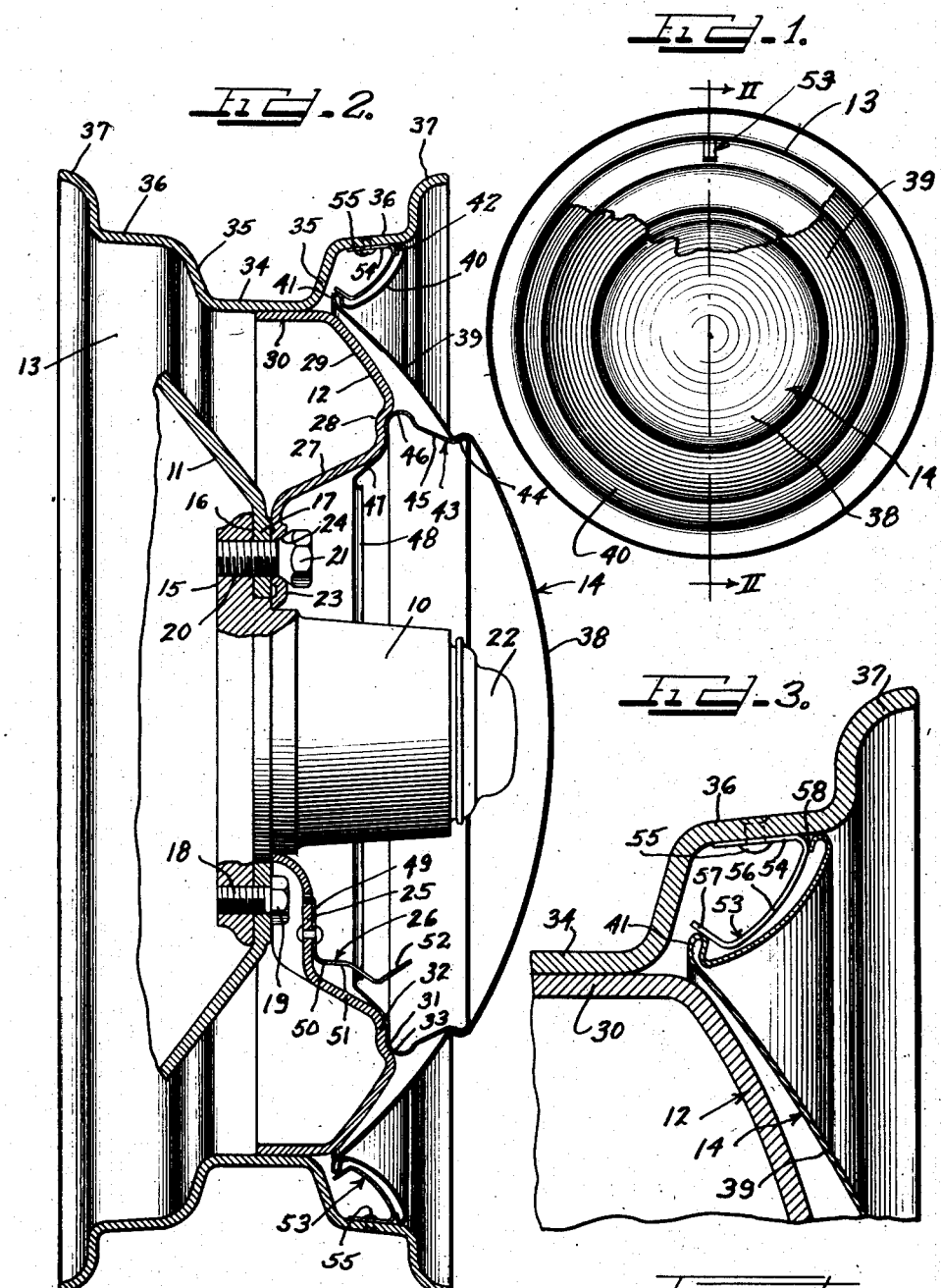

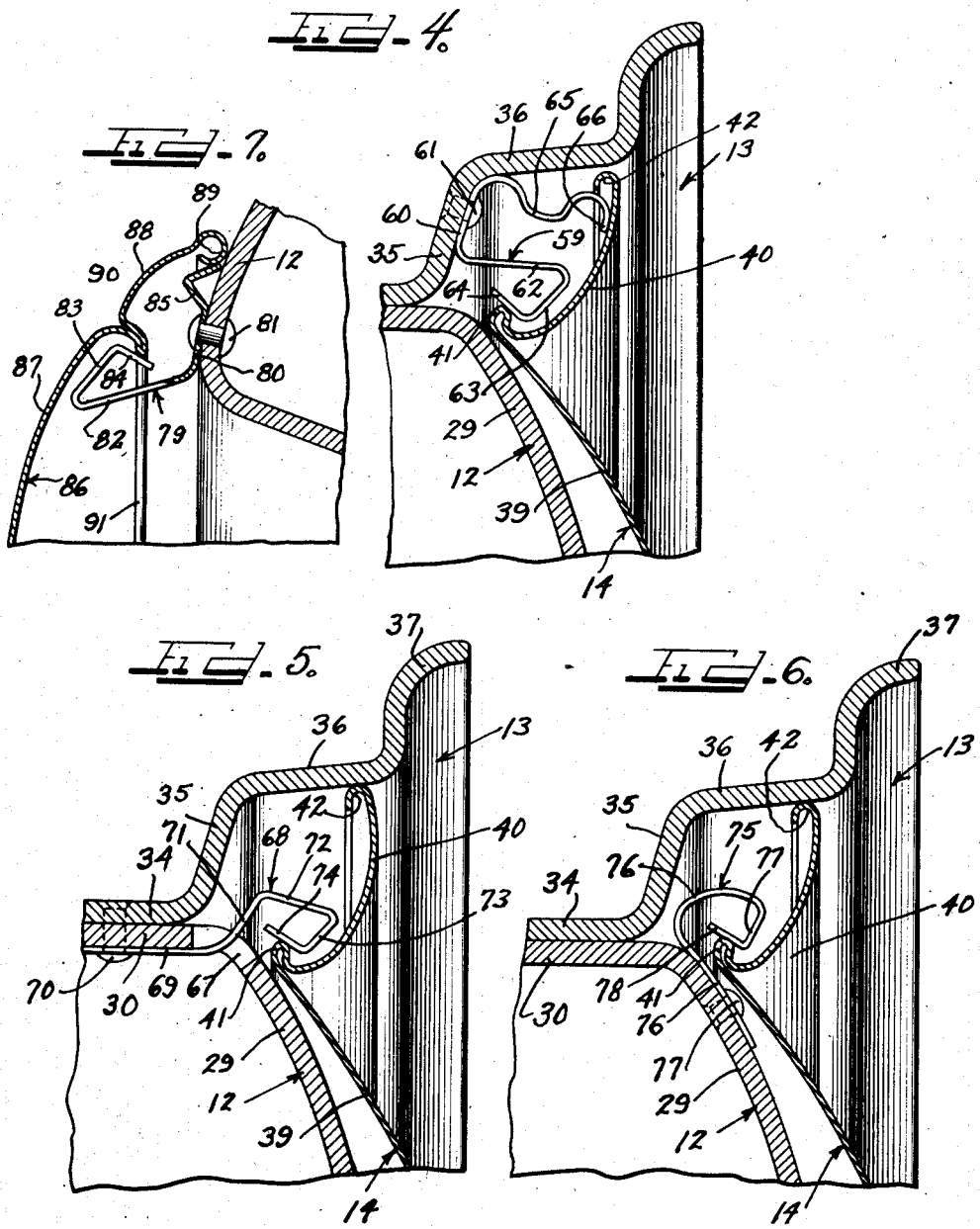

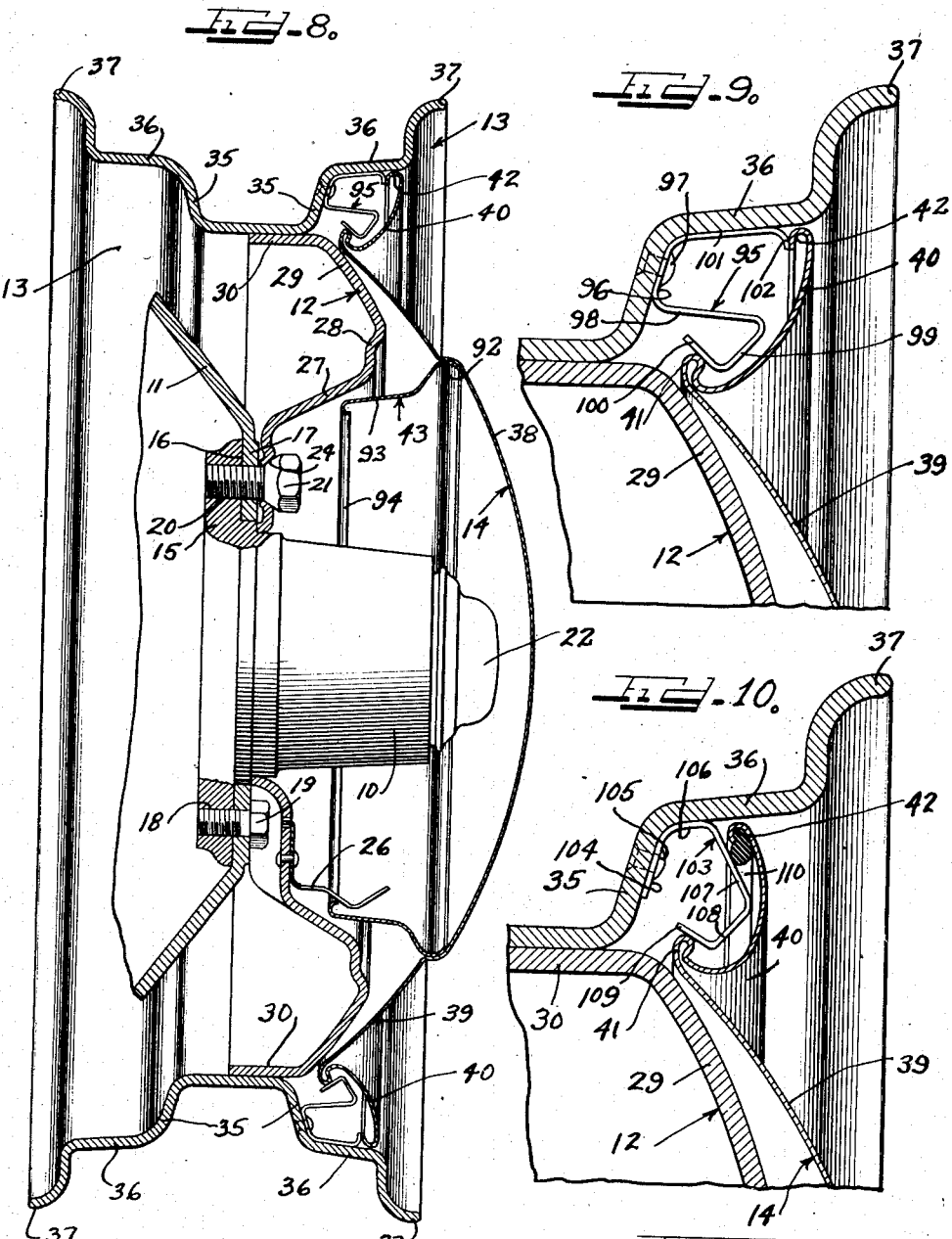

2,239,367

UNITED STATES PATENT OFFICE 2,239,367

WHEEL DISK MOUNTING

George Albert Lyon, Allenhurst, N. J.

Application June 4, 1938, Serial No. 211,778

11 Claims. (Cl. 301—37)

This invention relates to a wheel assembly, and more particularly to a novel wheel disk mounting.

It is an object of the present invention to provide a novel wheel assembly.

It is another object of this invention to provide a novel wheel disk mounting for detachably securing an ornamental wheel disk to a vehicle wheel.

It is a further object of this invention to provide a novel wheel disk mounting including dual sets of fastening fingers.

A still further object of this invention is to provide a novel arrangement for seating a wheel disk on a vehicle wheel.

Another and further object of this invention is to provide a novel wheel disk lift spring fastening element.

Another and still further object of this invention is to provide novel means for detachably securing and centering a wheel disk on a vehicle wheel.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a vehicle wheel with an ornamental wheel disk mounted thereon, a portion of the wheel disk being broken away to show one of the wheel disk fastening elements carried by the rim of the wheel;

Figure 2 is an enlarged cross-sectional elevational view of the wheel assembly shown in Figure 1 as taken along the line II—II thereof;

Figure 3 is an enlarged fragmentary sectional view of one of the outer spring elements in the wheel assembly;

Figure 4 is an enlarged fragmentary sectional view similar to Figure 3 showing a modified form of spring element;

Figure 5 is an enlarged fragmentary sectional view similar to Figure 3 showing a further modified form of spring element;

Figure 6 is an enlarged fragmentary sectional view similar to Figure 3 showing a still further modified form of spring element;

Figure 7 is an enlarged fragmentary view of a wheel and hub cap showing the novel means by which the hub cap is secured and centered in place on the body part of the wheel;

Figure 8 is a cross-sectional elevational view of a modified form of wheel assembly wherein the central attaching skirt of the wheel disk is not seated on the body part of the wheel;

Figure 9 is an enlarged fragmentary sectional view of the outer spring fastening element shown in Figure 8; and Figure 10 is an enlarged fragmentary sectional view similar to Figure 9 showing a modified form of wheel disk and spring mounting therefor.

Referring to the first embodiment of my invention which is illustrated in Figures 1 to 3 of the drawings, there is shown therein a wheel assembly comprising a hub 10, a brake drum 11, a wheel body part 12, a drop-center rim 13, and an ornamental wheel disk 14. The hub 10 is provided with a radial flange 15 having a recessed marginal portion 16 which is adapted to seat the radial fastening flange 17 of the brake drum 11. The radial flange 15 of the hub 10 is provided with an annular series of apertures 18 which are internally threaded for receiving the threaded shank of the brake drum mounting bolts 19. The radial flange 15 of hub 10 is also provided with a second annular series of apertures 20 spaced between the apertures 18 and along the same circumferential line. The apertures 20 are internally threaded for receiving the threaded shanks of the wheel fastening bolts 21. The radial flange 17 of the brake drum 11 is, of course, suitably apertured opposite the threaded apertures 18 and 20 of the radial hub flange 15 in order to permit the mounting bolts 19 and 21 to pass therethrough. The hub 10 is provided with the usual tapered bore (not shown) to receive the complementary end of the vehicle axle (not shown) and an axle cap 22 is provided at the outer end of the hub 10.

The body part 12 of the wheel includes a radial fastening flange 23 which is provided with countersunk apertures 24 opposite the apertures 20 of the radial hub flange 15. The radial flange 23 also includes a plurality of raised portions 25 alternately spaced between the recessed apertures 24 which extend over the heads of the brake drum mounting bolts 19 and also provide seats for the resilient fastening fingers 26 (presently to be described in detail).

The body part 12 of the wheel extends obliquely forwardly and radially outwardly from the radial flange 23 as at 27. The forward end of the oblique portion 27 merges into a substantially radial portion 28. Extending from the outer edge of the radial portion 28 is an obliquely rearwardly and radially outwardly extending portion 29 which is turned axially rearwardly at its outer end to form an axial shoulder or flange 30 which is welded or otherwise suitably secured to the rim 13.

The radial portion 28 of the wheel body part 12 is shaped to form a recess or groove 31, the groove 31 being defined by a radial wall 32 and an oblique forwardly and radially outwardly extending wall 33. This groove 31, as will presently appear, provides a novel seating arrangement for the wheel disk.

The drop-center rim 13 is of the usual form, and includes a base flange 34 opposite intermediate side flanges 35, opposite intermediate base flanges 36, and opposite edge portions 37. The drop-center rim 13 is of well known design and, as is well known to those skilled in the art, is arranged to seat and accommodate a pneumatic tire.

Disposed over the front face of the wheel assembly is an ornamental sheet metal wheel disk 14 which extends substantially over the entire outer surface of the wheel and terminates in proximity to the intermediate outer base flange 36 of the rim 13. The ornamental wheel disk 14 includes a dome shaped central or crown portion 38, an intermediate slightly convexed body portion 39, and an outer convex ring portion 40. At the junction point of the intermediate body portion 39 and the outer ring portion 40, an integral obliquely rearwardly and radially outwardly folded fastening flange 41 is provided. The outer edge of the ring portion 40 of the wheel disk 14 is curled, as at 42, and is arranged to be seated on the intermediate base flange 36 of the rim 13.

In addition to the integral folded fastening flange 41, a second fastening flange and wheel disk seating means 43 is provided on the wheel disk 14. The flange or skirt member 43 is welded or otherwise suitably secured to the wheel disk 14, preferably in proximity to the junction of the crown portion 38 and the intermediate body portion 39 of the wheel disk 14, as at 44. From this point, the flange or skirt 43 extends rearwardly and slightly outwardly, as at 45, and thereafter merges into an enlarged beaded portion 46, which is arranged to be seated in the channel or groove 31 in the body part 12 of the wheel. The flange or skirt 43 continues obliquely rearwardly and radially inwardly from the beaded portion 46 in a fastening skirt portion 47, which is terminated in an underturned rear edge 48.

Dual means are provided for detachably securing the wheel disk 14 in desired position on the wheel. This dual means includes an annular series of resilient fastening fingers 26, which are mounted on the raised portions 25 of the body part 12 of the wheel and which are arranged to snap over the underturned edge 48 of the skirt 43 on the wheel disk 14. Specifically, the fastening fingers 26 include a base portion 49 which is riveted or otherwise suitably secured to the raised portion 25 of the wheel, as at 50, an intermediate body portion 51, which extends forwardly from the base portion 49 and then obliquely forwardly and radially outwardly, and terminates in an obliquely inwardly turned forward end portion 52. As the wheel disk 14 is moved into position on the vehicle wheel, the underturned edge 48 engages the forward end 52 of the springs 26, causing them to be cammed under the underturned edge 48 until the high point of the spring element is passed and the springs snap up behind the edge 48.

The dual securing means previously referred to also includes a second set of attaching fingers 53 mounted on the rim 13 of the wheel, which extend into retaining engagement with the folded flange 41 of the wheel disk 14 to hold the latter in desired position on the wheel. The spring elements 53 will hereinafter be referred to as lift springs by virtue of the particular manner in which they act to detachably hold the wheel disk on the wheel. The term "lift spring" is employed to indicate that form of fastening finger or spring which enables the wheel disk or other cover member to be readily and easily snapped thereover, but which requires a relatively great force to effect a disengagement between the wheel disk or cover member and the spring, due to the fact that in order to disengage the wheel disk therefrom, the outer end of the spring is literally lifted outwardly with the wheel disk as the removal force is initially applied, thereby causing a greater and greater force resisting outward movement of the wheel disk until a critical point is passed in the disk and the disk snaps free of the spring. This form of spring and spring action is described and broadly claimed in my co-pending application for "Ornamental wheel disk and means for mounting same," Serial No. 156,279, filed July 29, 1937.

Referring now to the particular form of lift spring shown in Figures 2 and 3 of the drawings, the lift spring 53 includes a base portion 54, which is riveted or otherwise suitably secured to the intermediate base flange 36 of the rim 13, as at 55. Extending obliquely rearwardly and radially inwardly from the base portion 54 is an intermediate body portion 56 which is slightly curved or convexed in configuration. The rear end of the body portion 56 is terminated in an obliquely rearwardly and radially outwardly extending end portion 57, which is disposed substantially at right angles to the body portion 56. The end portion 57 is arranged to engage the folded flange 41 of the wheel disk 14. As the wheel disk 14 is moved into position on a vehicle wheel, it will be understood that the flange 41 first engages the body portion 56 of the spring 53, causing the same to flex radially outwardly until the high portion of the spring 53 at the junction of portions 56 and 57 passes over the outermost edge of the fastening flange 41. Thereafter the end portion 57 of spring 53 snaps in behind the fastening flange 41 to retain the same in desired position on the vehicle wheel.

When it is desired to remove the wheel disk 14 from the wheel, a tire tool, screw driver, or other similar tool is inserted between the outer edge 42 of the wheel disk 14 and the tire rim 13, and a sharp outward force is given the wheel disk 14. As the flange portion 41 first starts to move outwardly, the end portion 57 of the spring 53 is lifted or carried along therewith, there being a flexing of the spring at the junction of portions 56 and 54 and also a bending or flexing of the spring 53 throughout an intermediate portion of the curved body portion 56. After the spring has passed a critical point, the wheel disk 14 will snap clear of the spring 53 with considerable force.

Throughout the disengaging movement of the wheel disk 14 with the annular series of lift spring elements 53, the inner series of plain spring elements 26 are also becoming disengaged from the underturned edge 48 of the skirt 43 by an inward flexing of the spring elements 26 as the underturned edge 48 of the skirt 43 moves axially outwardly. It will, of course, be understood that the spring elements 26 merely maintain a frictional engagement with the underturned edge 48 of the fastening skirt 43, for they do not engage the wheel disk 14 in a manner to provide a "lift spring" action.

The use of a dual set of wheel disk fastening elements to secure a wheel disk to a vehicle wheel provides a more rigid mounting for the wheel assembly. The outer annular series of wheel disk fastening elements provides substantially a positive locking engagement of the wheel disk 14 on the vehicle wheel, while the inner annular series of friction fastening fingers 26 hold the central crown portion 38 of the wheel disk 14 in fixed position with the large annular bead portion 46 of the fastening skirt 43 firmly and snugly seated in the grooved portion 31 of the body part 12 of the wheel. Due to the fact that the grooved portion 31 of the body part 12 includes a wall portion which extends obliquely radially outwardly and axially forwardly, transverse movement or transverse vibration of the central portion of the wheel disk 14 is substantially eliminated. As may be seen best in Figure 3 of the drawings, the inturned curled outer edge 42 of the ring portion 40 of the wheel disk 14 is arranged to engage and bear against the outer base flange 36 of the rim 13 in a radial direction and is also arranged to abut against the axial outermost portion of each spring fastening element 53, as at 58.

In Figure 4 of the drawings, I have illustrated a modified form of the invention, and more particularly, I have illustrated a modified form of lift spring and ring portion abutting element. In this embodiment of the invention, a lift spring 59 is provided, which includes a base portion 60 riveted or otherwise suitably secured to the intermediate side flange 35 of the rim 13, as at 61. Extending axially forwardly from the radial inner edge of the base portion 60 is a main body portion 62. A second body portion 63 extends obliquely axially rearwardly and radially inwardly from the forward extremities of the portion 59 and terminates in an obliquely axially rearwardly and radially outwardly turned portion 64, which extends substantially at right angles to the portion 63. The portion 64 is arranged to engage the folded fastening edge or flange 41 of the wheel disk 14 in the same manner that the end portions 57 of the springs 53 engage the folded edge 41 in the first embodiment of the invention.

In connection with the lift spring illustrated in Figure 4, it will be understood that the "lift spring" action is obtained by virtue of the fact that the spring 59 is lifted or moved bodily outwardly with the wheel disk 14 as it is moved away from the wheel until a critical point is passed, at which time the wheel disk 14 snaps free and clear of the spring elements 59. During the removal action, the spring elements 59 flex at the junction of the portion 63 with the portion 62 and also at the junction of the portion 62 with the base portion 60.

The lift spring elements 59 also include a tail portion 65 which extends axially forwardly from the radial outer edge of the base portion 60 in a somewhat zig zag manner as shown and terminates in a radially inwardly turned forward edge 66. In this form of the invention, the ring portion 40 of the wheel disk 14 is not arranged to bear against the intermediate base flange 36 of the rim 13, but is arranged to directly bear against the outer end 66 of the tail portion 65 of the spring elements 59 and slightly compress the same so that an axially outwardly biasing force is applied to the outer portion of the wheel disk 14 to prevent the same from vibrating or rattling. The remainder of the wheel disk 14 is the same as that shown in Figures 1 and 2 of the drawings.

In Figure 5 of the drawings I have illustrated a further modified form of lift spring and a slightly different form of wheel body part 12 on the wheel. More specifically, the wheel body part 12 is provided with an annular series of apertures 67 at the junction of the oblique portion 29 with the axially extending shoulder portion 30 of the body part 12. A plurality of lift springs 68 are mounted on the wheel corresponding in number to the apertures 67. Each lift spring 68 includes a base portion or tail 69 which extends through an aperture 67 and is seated on the radial inner surface of the portion 30 of the body part 12 of the wheel. The tail or base portion 69 of the spring element 68 is riveted or otherwise suitably secured to the wheel assembly such, for example, as by means of rivets 70. The spring 68 extends obliquely forwardly and radially outwardly from the forward edge of the base portion 69 as at 71, and then axially forwardly and slightly radially inwardly as at 72, then obliquely radially inwardly and axially rearwardly as at 73, and finally obliquely rearwardly and radially outwardly, as at 74. The portion 74 is arranged to extend substantially right angles to the portion 73 and engages the folded flange 41 to substantially hold the wheel disk 14 in desired position on the wheel.

The lift spring action in the form of the invention shown in Figure 5 is substantially the same as that shown in Figure 4, the points of flexure of the spring elements 68 during the removal of the wheel disk 14 from the wheel being at the junction of portion 73 with 72 and at the junction of the portion 72 with the portion 71. In this form of the invention, the outer curled edge 42 of the ring portion 40 of the wheel disk 14 is arranged to bear against the outer intermediate base flange 36 of the rim 13 in the same manner as that described in connection with Figures 1 to 3.

In Figure 6 of the drawings, I have illustrated a further embodiment of my invention wherein the lift springs are secured to the oblique portion 29 of the body part 12 of the wheel. More specifically, an annular series of lift springs 75 are provided, each of which has a tail portion 76 that is riveted or otherwise suitably secured to the oblique portion 39 of the body part 12 of the wheel, as at 77. From the base portion 76, the spring 75 is curled radially outwardly, and then forwardly in a curved body portion 76 and is then bent radially inwardly and axially rearwardly, as at 77. The inner end of the portion 77 merges into an obliquely axially rearwardly and radially outwardly portion 78, which extends substantially at right angles to the portion 77. The portion 78 is arranged to extend behind the folded portion 41 of the wheel disk 14 to detachably hold the same in place on the wheel. The curled outer edge 42 of the ring portion 40 of the wheel disk 14 abuts and bears against the intermediate outer base flange 36 of the rim 13 in the same manner as that described in connection with that described in Figures 1 to 3 of the drawings.

In Figure 7 of the drawings, I have illustrated a different embodiment of the present invention, wherein a hub cap is mounted on a vehicle wheel rather than a complete wheel disk. In this embodiment of the invention, the inner series of fastening fingers 26 have been eliminated, and only a single set of lift springs 29 are employed. More specifically, an annular series of lift springs 79 are provided, each having a base portion 80 which is riveted or otherwise suitably secured to the body part 12 of a vehicle wheel, as at 81. Each lift spring 79 extends forwardly from the radial inner edge of the base portion 80 in a main body portion 82 and then radially outwardly and axially rearwardly, as at 83, and finally axially rearwardly and radially inwardly, as at 84. The spring 79 also includes a V-shaped tail portion 85, as is clearly shown in Figure 7 of the drawings. A hub cap 86 is provided, which includes a central crown or dome shaped portion 87 and an outer ring portion 88, which is terminated in a curled outer edge 89, which bears against the outer slope of the V-shaped portion 85 of the spring element 79. The crown portion 87 and the outer ring portion 88 of the hub cap or small wheel disk 86 are joined by a rearwardly extending tightly folded portion 90, which is inturned at its rearward end to form a fastening edge 91 for engagement with the end portion 84 of the spring element 79.

As the hub cap 86 is moved into position on the wheel, the edge 91 of the skirt 90 engages the spring portion 83 and causes a flexure thereof radially inwardly until the edge 91 passes over the high point of the spring, as defined by the junction of the spring portion 83 with the end portion 84. Thereafter, the end portion 84 snaps up behind the edge 91 of the skirt 90 to hold the same in desired position on the wheel. When a removal force is applied to the hub cap 86 and the skirt 90 starts to move outwardly away from the wheel, the end portion 84 of the spring 79 is lifted or carried along with the edge 91 of the skirt 90 for a slight distance until a critical point is passed, at which time the hub cap 86 will snap free and clear of the spring elements 79. During the "lift action" of the spring elements 79, these elements are flexing at the junction of the portion 83 with the portion 82 and also at the junction of the portion 82 with the base portion 80 of the spring 79.

It will, of course, be understood that the V-shaped tail portion 85 of the spring elements 79 serve to assist in centering the hub cap 86 on the wheel as well as to provide a suitable seat for the outer edge 89 of the hub cap 86 and prevent lateral or transverse vibration of the hub cap when mounted on the wheel.

In Figures 8 and 9 of the drawings I have illustrated a modified form of my invention as shown in Figures 1 to 3, particularly with respect to the rearwardly extending central skirt 43 and also with respect to the lift spring retaining fingers, which engage the outer portion of the wheel disk. Portions of the wheel assembly in Figures 8 and 9 which are similar to portions in Figures 1 to 3, have been given corresponding reference characters in order to simplify the illustration and description of this embodiment of the invention.

The wheel disk 14 in this embodiment of the invention is provided with a rearwardly extending skirt 43 having a curled portion 92 which is welded or otherwise suitably secured to the rear face of the wheel disk 14 at the outer edge of the crown portion 38. The skirt 43 includes a main body portion 93 which extends substantially axially rearwardly and is disposed radially inwardly in spaced relation to the oblique portion 27 of the wheel body part 12. An underturned edge 94 is provided at the rear end of the portion 93 for engagement with the retaining fingers 26. The remaining portion of the wheel disk 14 is substantially the same as that described in connection with Figures 1 to 3 of the drawings with the exception that the outer curled edge 42 of the ring portion 40 is slightly spaced from the intermediate base flange 36.

Secured to the outer intermediate side flange of the rim 13 is an annular series of lift springs 95, each of which includes a base portion 96 riveted or otherwise suitably secured to the outer intermediate side flange 35, as at 97, and an axially forwardly extending body portion 98, which is turned axially rearwardly and radially inwardly as at 99, at its forward end, and then axially rearwardly and radially outwardly in an end portion 100. The end portion 100 is arranged to engage the folded flange or edge 41 of the wheel disk 14 in the same manner as that described in connection with Figure 4 of the drawings. The spring elements 95 also include a tail portion 101 which is seated on the radial inward surface of the outer intermediate base flange 36 of the rim 13 and is provided with an inturned forward end 102 against which the inturned outer edge 42 of the wheel disk 14 bears. The remainder of the wheel assembly of Figures 8 and 9 is substantially the same as that illustrated and described in connection with Figures 1 to 3 of the drawings.

In Figure 10 of the drawings, I have illustrated a modified form of the species shown in Figures 8 and 9. More specifically, an annular series of lift springs 103 are provided each of which includes a base portion 104, which is riveted or otherwise suitably secured to the outer intermediate side flange 35, as at 105. The spring elements 103 are provided with a body portion 106 which extends forwardly from the radial outer edge of the base portion 104 and an radially inwardly and axially forwardly extending portion 107. The inner end of the portion 107 is bent axially rearwardly and radially inwardly, as at 108, and then axially rearwardly and radially outwardly, as at 109. The portion 109 engages the folded edge 41 of the wheel disk 14 in the same manner as that described in connection with Figures 8 and 9 of the drawings. The outer inturned edge 42 of the ring portion 40 of the wheel disk 14 is equipped with a cushioning bead 110 formed of any suitable material, such as rubber, for bearing against the portion 107 of each spring element 103. The cushioning ring 110 is provided with substantially a figure 8 cross-sectional configuration, the smaller portion of which is crimped within the curled outer edge 42. The remainder of the wheel assembly is the same as that described in connection with Figures 8 and 9 of the drawings.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. For disposition on a wheel of the type having concentric annular rows of attaching elements, a wheel disk comprising a crown portion, an intermediate ring portion and an outer ring portion, said intermediate and outer ring portions being connected by an integral rearwardly extending folded flange and said crown portion having a rearwardly extending skirt member secured thereto.

2. For disposition on a wheel of the type having concentric annular rows of attaching elements, a wheel disk comprising a crown portion, an intermediate ring portion and an outer ring portion, said intermediate and outer ring portions being connected by an integral rearwardly extending folded flange and said crown portion having a rearwardly extending skirt member secured thereto, said folded flange and said skirt being arranged to be engaged by said concentric rows of attaching elements.

3. For disposition on a wheel of the type having concentric annular rows of attaching elements, a wheel disk comprising a crown portion, an intermediate ring portion and an outer ring portion, said intermediate and outer ring portions being connected by an integral rearwardly extending folded flange and said crown portion having a rearwardly extending skirt member secured thereto, said folded flange and said skirt being arranged to be engaged by said concentric rows of attaching elements, and an intermediate annular portion of said skirt being shaped and arranged to be seated on said wheel.

4. For disposition on a wheel of the type having concentric annular rows of attaching elements, a wheel disk comprising a crown portion, an intermediate ring portion and an outer ring portion, said intermediate and outer ring portions being connected by an integral rearwardly extending folded flange and said crown portion having a rearwardly extending skirt member secured thereto, said folded flange and said skirt being arranged to be engaged by said concentric rows of attaching elements and said skirt haivng a relatively large raised beaded portion disposed intermediate its inner and outer extremities to be seated on said wheel.

5. In combination with a vehicle wheel having a body part, an annular intermediate portion of which is bulged axially outwardly, said bulged portion having an annular grooved portion therein facing axially outwardly, a wheel disk having a rearwardly extending skirt, an intermediate portion of which is arranged to be seated in said grooved portion.

6. In combination with a vehicle wheel having a body part, an annular intermediate portion of which is bulged axially outwardly, said bulged portion having an annular grooved portion therein facing axially outwardly, a wheel disk having a rearwardly extending skirt, an intermediate portion of which is arranged to be seated in said grooved portion, the portion of said skirt disposed axially rearwardly of said intermediate portion being shaped to extend into said wheel past said bulged portion.

7. In combination with a vehicle wheel having a protruding outer face provided with an annular grooved portion therein, a wheel disk having a rearwardly extending skirt, an intermediate portion of which is arranged to be seated in said grooved portion, the portion of said skirt disposed axially rearwardly of said intermediate portion being shaped to extend into said wheel past said protruding outer face, and be terminated in a curled inner edge, and a plurality of resilient fastening fingers on said wheel for frictionally engaging said curled inner edge.

8. As an article of manufacture, a lift spring comprising a base portion, a second portion extending from one end of and at substantially a right angle to said base portion then being bent obliquely backwardly on itself away from said base portion and terminating in an end portion bent substantially at right angles to said last portion and toward said base portion, and a third portion extending from the opposite end of said base portion in spaced relationship to said second portion and terminating in a turned end.

9. In a wheel assembly including a wheel comprising rim and body parts, and a wheel disk for disposition over an outer face thereof, wheel disk attaching means comprising a base portion secured to said wheel, a lift spring portion extending from said base portion and detachably securing said disk to said wheel, and a disk aligning portion connected to and extending from said base portion into abutting engagement with said disk at a point spaced from the point at which said lift spring portion makes a detachable securing engagement with said disk.

10. In a wheel assembly including a wheel comprising rim and body parts, and a wheel disk for disposition over an outer face thereof, wheel disk attaching means comprising a base portion secured to said wheel, a lift spring portion detachably securing said disk to said wheel, and a flexible portion connected to and extending from said base portion and arranged to align said disk in desired position for engagement with said lift spring portion.

11. For disposition on a wheel of the type having concentric annular rows of wheel disk retaining elements, a wheel disk comprising a crown portion, an intermediate ring portion and an outer ring portion, said outer ring portion being of concavo-convex cross section and having inside thereof shoulder means for engagement with the elements of one of said rows, said intermediate and outer ring portions being connected by an integral rearwardly extending folded flange, and said crown portion having a rearwardly extending skirt connected thereto and formed to be engaged by the elements of the other of said rows.

GEORGE ALBERT LYON.